US012719517B2

(12) United States Patent
Duron et al.

(10) Patent No.: US 12,719,517 B2
(45) Date of Patent: Aug. 25, 2026

(54) ULTRA-HIGH RESOLUTION REFLECTIVE VECTOR SYNTHESIZER FOR RADIO FREQUENCY (RFID) SYSTEMS

(71) Applicant: ZEBRA TECHNOLOGIES CORPORATION, Lincolnshire, IL (US)

(72) Inventors: Mark W. Duron, Mastic, NY (US); Alpasian Demir, East Meadow, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 301 days.

(21) Appl. No.: 18/666,523

(22) Filed: May 16, 2024

(65) Prior Publication Data

US 2025/0357956 A1 Nov. 20, 2025

(51) Int. Cl.
*H04B 1/10* (2006.01)
*H04B 5/72* (2024.01)

(52) U.S. Cl.
CPC ............. *H04B 1/1027* (2013.01); *H04B 5/72* (2024.01)

(58) Field of Classification Search
CPC ........ H04B 1/1027; H04B 5/72; H04B 7/015; G06K 7/0008
See application file for complete search history.

(56) References Cited

U.S. PATENT DOCUMENTS

| | | | | |
|---|---|---|---|---|
| 7,941,105 | B1 * | 5/2011 | McCall | H04B 1/0458 455/114.2 |
| 9,559,639 | B2 * | 1/2017 | Su | H03F 3/24 |
| 2022/0158686 | A1 * | 5/2022 | Beaudin | H03H 7/463 |
| 2023/0370110 | A1 * | 11/2023 | Qin | H04B 1/0458 |
| 2024/0210503 | A1 * | 6/2024 | Myer | G01R 33/3621 |
| 2024/0219561 | A1 * | 7/2024 | El Ozeir | G01S 7/4013 |
| 2025/0219602 | A1 * | 7/2025 | Khalil | H04B 17/16 |
| 2025/0226856 | A1 * | 7/2025 | Demir | H04B 7/015 |

* cited by examiner

*Primary Examiner* — Cindy Trandai

(57) ABSTRACT

Techniques for ultra-high resolution reflective vector synthesis in RFID systems include a transceiver configured to transmit an initial signal, one or more memories, one or more processors, and a cancellation signal synthesizer comprising a variable impedance device. The cancellation signal synthesizer receives a power amplifier output sample associated with the initial signal, splits the power amplifier output sample into a first signal directed along a first pathway and a second signal directed along a second pathway, and delays the first signal to cause the first signal to be out of phase with the second signal. The one or more processors execute instructions stored in the one or more memories to cause the RFID systems to determine at least one signal characteristic of a cancellation signal based on the first signal and the second signal and cause the cancellation signal synthesizer to generate the cancellation signal to cancel a reflected signal.

15 Claims, 7 Drawing Sheets

ULTRA-HIGH RESOLUTION REFLECTIVE VECTOR SYNTHESIZER FOR RADIO FREQUENCY (RFID) SYSTEMS

FIELD OF THE DISCLOSURE

The present disclosure relates to Radio-Frequency Identification (RFID) systems, and more particularly to ultra-high resolution reflective vector synthesizers for RFID systems.

BACKGROUND

RFID systems use radio wave communications to identify and/or track RFID tags affixed to objects. More particularly, an antenna of an RFID reader (sometimes referred to as an "interrogator") transmits an interrogation signal that is received by an RFID tag within range of the RFID reader. The RFID tag, after receiving the interrogation signal, uses an antenna therein to transmit a response signal, which contains information identifying the RFID tag and/or the object to which the RFID tag is affixed. Accordingly, the exchange of radio-frequency signals between the RFID reader and tag enables the RFID reader to detect and obtain information regarding various objects in an environment when respective RFID tags are affixed thereto. RFID systems can be implemented as, but are not limited to, inventory management and tracking systems in which an RFID reader is used to identify and track the locations of respective objects (e.g., products) in a manufacturing, shipping, storage and/or retail environment.

Signals from the RFID reader are output at an antenna port of the RFID reader at a desired power level (e.g., 30 decibel-milliwatts (dBm)). This output, however, creates an echo or "self-jamming" signal back to the RFID reader. If not mitigated, the echo signal at the RFID reader impedes the ability of the RFID reader to reliably detect responses from RFID tags.

SUMMARY

In some aspects, the techniques described herein relate to an assembly including: a transceiver configured to transmit an initial signal; a cancellation signal synthesizer including a variable impedance device, the cancellation signal synthesizer being configured to: receive a power amplifier output sample associated with the initial signal, split the power amplifier output sample into a first signal directed along a first pathway and a second signal directed along a second pathway, and delay the first signal to cause the first signal to be out of phase with the second signal; one or more processors; and one or more memories communicatively coupled to the transceiver, the cancellation signal synthesizer, and the one or more processors storing instructions that, when executed by the one or more processors, cause the assembly to: determine at least one signal characteristic of a cancellation signal based on the first signal and the second signal, and cause the cancellation signal synthesizer to generate the cancellation signal to at least partially cancel a reflected signal.

In some aspects, the techniques described herein relate to an assembly, wherein the instructions further cause the assembly to determine the at least one signal characteristic of the cancellation signal by: estimating, based on the first signal and the second signal, a phase and a magnitude of the reflected signal; determining, using a lookup table, the at least one signal characteristic based on the phase and the magnitude; and adjusting an impedance value of the variable impedance device to enable the cancellation signal synthesizer to generate the cancellation signal.

In some aspects, the techniques described herein relate to an assembly, wherein the instructions further cause the assembly to determine the at least one signal characteristic of the cancellation signal by: determining quadrature signal characteristics of a quadrature signal based on the first signal; and determining in-phase signal characteristics of an in-phase signal based on the second signal, and wherein the cancellation signal is a combination of the quadrature signal and the in-phase signal.

In some aspects, the techniques described herein relate to an assembly, wherein the cancellation signal is a first cancellation signal, the reflected signal is a first reflected signal, and after the cancellation signal synthesizer generates the first cancellation signal, the instructions further cause the assembly to: (a) estimate a power level of a second reflected signal; (b) determine at least one signal characteristic of a second cancellation signal based on the power level; and (c) adjust an impedance value of the variable impedance device to enable the cancellation signal synthesizer to generate the second cancellation signal.

In some aspects, the techniques described herein relate to an assembly, wherein the instructions further cause the assembly to: (d) iteratively perform steps (a)-(c) until a minimum reflected power threshold is satisfied or a timeout threshold is exceeded.

In some aspects, the techniques described herein relate to an assembly, wherein a distance of the first pathway is different than a distance of the second pathway.

In some aspects, the techniques described herein relate to an assembly, wherein the first signal traveling along the first pathway causes the first signal to be approximately 45° out of phase with the second signal.

In some aspects, the techniques described herein relate to an assembly, wherein the instructions further cause the assembly to cause the cancellation signal synthesizer to utilize pulse width modulation when generating the cancellation signal.

In some aspects, the techniques described herein relate to an assembly, wherein the variable impedance device is at least one of a pin diode, a field effect transistor (FET), or a bipolar junction transistor (BJT).

In some aspects, the techniques described herein relate to a method including: transmitting, by a transceiver, an initial signal; receiving a power amplifier output sample associated with the initial signal; splitting the power amplifier output sample into a first signal directed along a first pathway and a second signal directed along a second pathway; delaying the first signal to cause the first signal to be out of phase with the second signal; determining, by one or more processors, at least one signal characteristic of a cancellation signal based on the first signal and the second signal; and causing, by the one or more processors, a cancellation signal synthesizer to generate the cancellation signal to at least partially cancel a reflected signal.

In some aspects, the techniques described herein relate to a method, wherein the cancellation signal synthesizer includes a variable impedance device, and determining the at least one signal characteristic of the cancellation signal further includes: estimating, by the one or more processors based on the first signal and the second signal, a phase and a magnitude of the reflected signal; determining, by the one or more processors using a lookup table, the at least one signal characteristic based on the phase and the magnitude; and adjusting, by the one or more processors, an impedance value of the variable impedance device to enable the cancellation signal synthesizer to generate the cancellation signal.

In some aspects, the techniques described herein relate to a method, wherein determining the at least one signal characteristic of the cancellation signal further includes: determining, by the one or more processors, quadrature signal characteristics of a quadrature signal based on the first signal; and determining, by the one or more processors, in-phase signal characteristics of an in-phase signal based on the second signal, and wherein the cancellation signal is a combination of the quadrature signal and the in-phase signal.

In some aspects, the techniques described herein relate to a method, wherein the cancellation signal is a first cancellation signal, the reflected signal is a first reflected signal, the cancellation signal synthesizer includes a variable impedance device, and after the cancellation signal synthesizer generates the first cancellation signal, the method further includes: (a) estimating, by the one or more processors, a power level of a second reflected signal; (b) determining, by the one or more processors, at least one signal characteristic of a second cancellation signal based on the power level; and (c) adjusting, by the one or more processors, an impedance value of the variable impedance device to enable the cancellation signal synthesizer to generate the second cancellation signal.

In some aspects, the techniques described herein relate to a method, further including: (d) iteratively performing steps (a)-(c) until a minimum reflected power threshold is satisfied or a timeout threshold is exceeded.

In some aspects, the techniques described herein relate to a method, wherein a distance of the first pathway is different than a distance of the second pathway.

In some aspects, the techniques described herein relate to a method, wherein the first signal traveling along the first pathway causes the first signal to be approximately 45° out of phase with the second signal.

In some aspects, the techniques described herein relate to a method, wherein causing the cancellation signal synthesizer to generate the cancellation signal further includes: causing, by the one or more processors, the cancellation signal synthesizer to utilize pulse width modulation when generating the cancellation signal.

In some aspects, the techniques described herein relate to a method, wherein the cancellation signal synthesizer includes a variable impedance device that is at least one of a pin diode, a field effect transistor (FET), or a bipolar junction transistor (BJT).

In some aspects, the techniques described herein relate to a tangible machine-readable medium including instructions that, when executed, cause a machine to at least: transmit an initial signal; receive a power amplifier output sample associated with the initial signal; split the power amplifier output sample into a first signal directed along a first pathway and a second signal directed along a second pathway; delay the first signal to cause the first signal to be out of phase with the second signal; determine at least one signal characteristic of a cancellation signal based on the first signal and the second signal; and cause a cancellation signal synthesizer to generate the cancellation signal to at least partially cancel a reflected signal.

In some aspects, the techniques described herein relate to a tangible machine-readable medium, wherein the cancellation signal is a first cancellation signal, the reflected signal is a first reflected signal, the cancellation signal synthesizer includes a variable impedance device, and after the cancellation signal synthesizer generates the cancellation signal, the instructions, when executed, further cause the machine to at least: (a) estimate a power level of a second reflected signal; (b) determine at least one signal characteristic of a second cancellation signal based on the power level; (c) adjust an impedance value of the variable impedance device to enable the cancellation signal synthesizer to generate the second cancellation signal; and (d) iteratively perform steps (a)-(c) until a minimum reflected power threshold is satisfied or a timeout threshold is exceeded.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
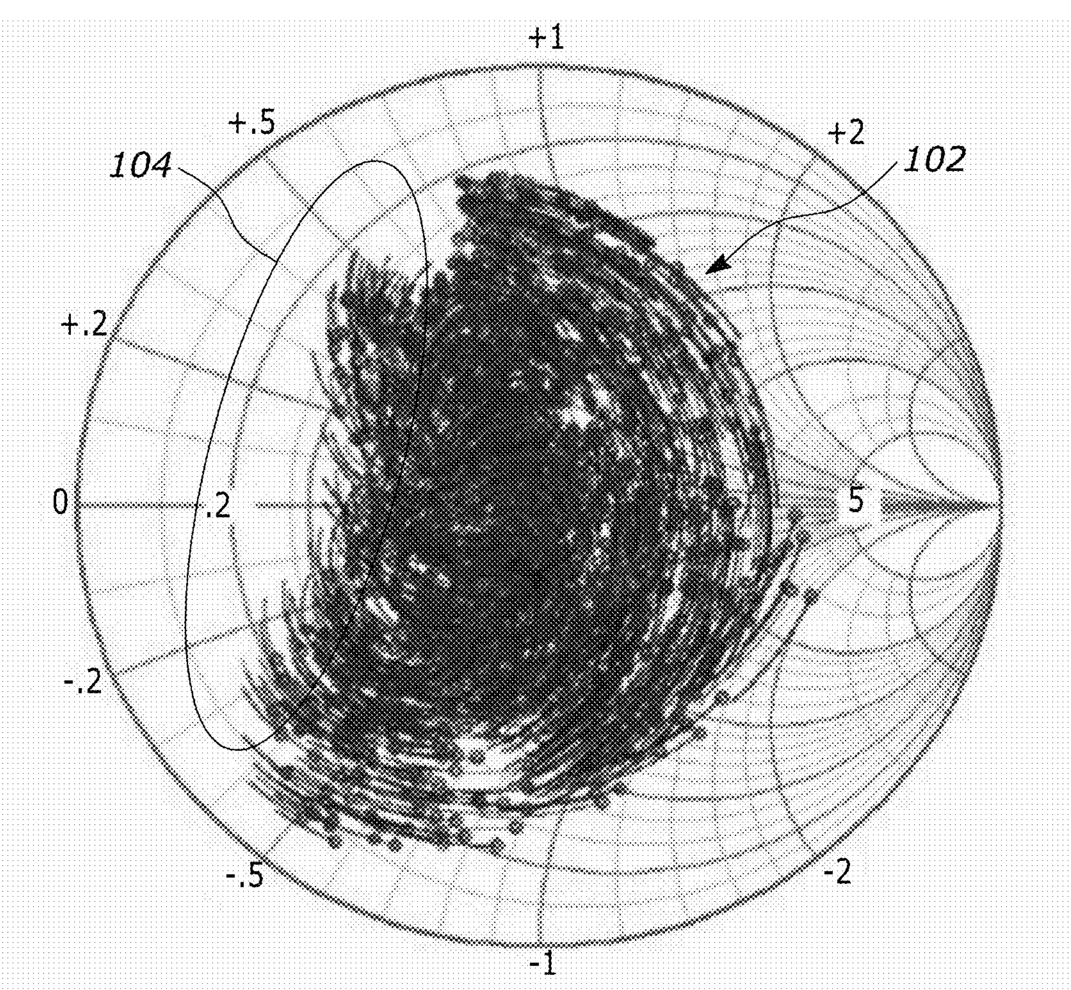
FIG. 1 depicts a Smith chart representing composite cancellation signals that prior art cancellation signal synthesizers are capable of generating.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, RFID systems are utilized in a variety of environments, for example to detect and/or track locations of objects in a manufacturing, shipping, storage, and/or retail environment. An RFID reader may be implemented as a battery powered handheld unit, and transmits an interrogation signal that is detected by an RFID tag affixed to an object (or by multiple RFID tags affixed to respective objects). The RFID tag responds to a received interrogation signal with a response signal that includes information identifying the RFID tag and/or the object to which the RFID tag is affixed. Thus, using the identifying information, the RFID reader (and/or another computing device communicatively connected thereto, e.g., an operator's smartphone) may obtain, manipulate and/or display information associated with detected RFID tags and objects in an environment.

The transmission of signals by the RFID reader (e.g., as described above) produces an output power that can be measured, for example, at a port of an antenna of the RFID reader. In practical use cases, this output power may, for example, be 30 dBm. When the RFID reader employs reasonably high output power (e.g., in the practical use cases described herein), the signal transmissions produce a reflected signal that is received back at the RFID reader antenna (this signal is also referred to herein as a "self-jamming signal" or "echo signal"). The reflected signal, generally speaking, maintains the characteristics of the corresponding transmitted signal from the RFID reader (e.g., wavelength, frequency, etc.). The power level of the echo signal can, for example, be approximately 20 dBm, in practical use cases. This reflected power level is substantially greater than the power level of responses from RFID tags, which in practical use cases may be no higher than −30 dBm and possibly as low as −90 dBm (effectively, between $10^6$ and $10^{12}$ times weaker than the reflected signal). Thus, the reflected signal poses a risk of causing saturation of the input radio frequency (RF) front end of the RFID reader (e.g., the circuitry between the RFID antenna and mixer), and impedes the ability of the RFID reader to detect the comparatively weaker RFID tag responses amid the stronger reflected signal.

The present disclosure considers reflected signal cancellation solutions to prevent the input RF front end saturation, e.g., using a cancellation signal synthesizer (e.g., circuit) that may for example be disposed between the antenna and an integrated circuit (IC) chip (e.g., ASIC) of the RFID reader. The cancellation signal synthesizer can be achieved using discrete parts, or alternatively, may be integrated in the RFID reader to reduce size and cost of the RFID reader while aiming to retain reflected signal cancellation performance (e.g., adding the cancellation signal synthesizer to an IC of the RFID reader that already performs other functionalities). An integrated reflected signal canceller (e.g., cancellation signal synthesizer) generates a cancellation signal (e.g., error vector) that is the same magnitude but out of phase with the reflected signal (e.g., 180 degrees out of phase), such that the cancellation signal cancels out the reflected signal thereby producing reflected signal cancellation.

However, conventional techniques for performing reflected signal cancellation suffer from a number of drawbacks. For example, conventional reflected signal cancellers typically receive forward energy of the reflected signal and reflect it back to sum with, and thereby partially cancel, the reflected signal. This conventional form of signal cancelling is frequently inaccurate and fails to provide an exact or nearly exact set of characteristics for an ideal cancellation signal. Thus, conventional reflected signal cancellers suffer from a lack of accuracy, which causes corresponding insensitivity in the associated RFID reader when the cancellation signal fails to adequately cancel the reflected signal (i.e., higher noise).

Additionally, these conventional reflected signal cancellers often use digital tuned capacitors (DTCs), which generally have limited resolution when generating cancellation signals and thereby fail to produce sufficiently deep nulls for many applications. These insufficiently deep nulls correspond to less overall cancellation of the reflected signal from the cancellation signal that the conventional reflected signal canceller generated. Consequently, RFID readers utilizing these conventional reflected signal cancellers have decreased sensitivity and lower effective range to "hear" RFID tags and are therefore less effective.

Further, conventional reflected signal cancellers leveraging such DTCs also frequently experience over voltage failures and limited "Q" factors. Generally speaking, the operability and performance quality (i.e., the "Q-factor") of a circuit is improved by operating capacitors within their specified voltage range to achieve better impedance matching and lower reflection coefficients. DTCs have a relatively limited voltage range (e.g., 5-bit each) and thus have a limited capability to accommodate impedance matching across a variety of circumstances. Moreover, reflected signals can create voltage peaks that breakdown these DTCs. To avoid this issue, certain voltage values are locked out of the DTCs, which necessarily depletes the number of available solutions the conventional reflected signal cancellers can provide. Thus, conventional reflected signal cancellers typically suffer from a limited/reduced quality factor ("Q-factor") and number of reflection coefficients than required in many applications.

To illustrate some of the issues experienced by conventional reflected signal cancellers, FIG. 1 depicts a Smith chart 100 representing composite cancellation signals that prior art cancellation signal synthesizers are capable of generating. Broadly speaking, a Smith chart is a graphical tool used in RF engineering to represent the complex impedance of a transmission line or circuit over a frequency range. It is a polar plot of the complex reflection coefficient (the "S11 parameter") and is typically used for impedance matching, measuring transmission line properties, and other uses. The horizontal axis represents the real component of the impedance (i.e., the "in-phase" component), and the vertical axis represents the imaginary component of the impedance (i.e., the "quadrature" component).

The S11 parameter is plotted on the Smith chart to represent how much of a given transmission signal is reflected. The path of the S11 parameter on the Smith chart thereby indicates how the reflection coefficient changes with frequency, and typically follows a circular path on the chart, reflecting the varying impedance of the circuit. For example, as illustrated in FIG. 1, the Smith chart 100 includes a plurality of S11 parameter paths 102 representing composite cancellation signals that prior art cancellation signal synthesizers are capable of generating. Notably, the plurality of S11 parameter paths 102 lacks a large number of paths, for example, in the region 104. Thus, the Smith chart 100 visually indicates the lack of capability conventional reflected signal cancellers have to generate cancellation signals across a wide variety of impedances and frequencies, and therefore substantially lack the capability to effectively cancel reflected signals.

To overcome the issues experienced by conventional reflected signal cancellers, the techniques of the present disclosure introduce a cancellation signal synthesizer with a variable impedance device. The cancellation signal synthesizer of the present disclosure is configured to receive power amplifier output samples, split the power amplifier output samples along two pathways, and delay one of the split signals to cause them to be relatively out of phase. With the split/delayed signals, the techniques of the present disclosure then determine characteristics of a cancellation signal and cause the synthesizer to generate the cancellation signal and thereby (at least partially) cancel the reflected signal.

By splitting the power amplifier output sample along two pathways and delaying one of the split signals, the techniques of the present disclosure can determine an exact or nearly exact set of characteristics required in the cancellation signal. As mentioned, conventional techniques generally lack this capability and correspondingly suffer from a substantial lack of accuracy when generating the cancellation signal, resulting in significant insensitivity of the associated RFID reader. The techniques of the present disclosure therefore overcome this issue of conventional reflected signal cancellers and reduce/eliminate the inaccuracies of cancellation signal generation, and thereby significantly increase the sensitivity of the associated RFID reader.

The techniques of the present disclosure also reduce/eliminate many of the issues faced by conventional reflected signal cancellers utilizing DTCs. Namely, by utilizing a variable impedance device, the techniques of the present disclosure can adjust the impedance of the cancellation signal synthesizer with high accuracy, as necessary, to generate a cancellation signal with the exact or nearly exact set of characteristics required to cancel the reflected signal. The techniques of the present disclosure thus avoid the voltage lockouts required in the conventional reflected signal cancellers utilizing DTCs, and thereby do not limit the number of available solutions (i.e., signal characteristics) to generate a cancellation signal. In this manner, the cancellation signal synthesizer of the present disclosure has a higher/improved Q-factor and can accommodate more reflection coefficients than conventional reflected signal cancellers.

Of course, it should be appreciated that the advantages and technical improvements described above and elsewhere herein are not the only advantages and/or technical improvements that may be realized as a result of the techniques described herein.

Example Cancellation Signal Synthesizer Circuit Architectures

Figure 2A:
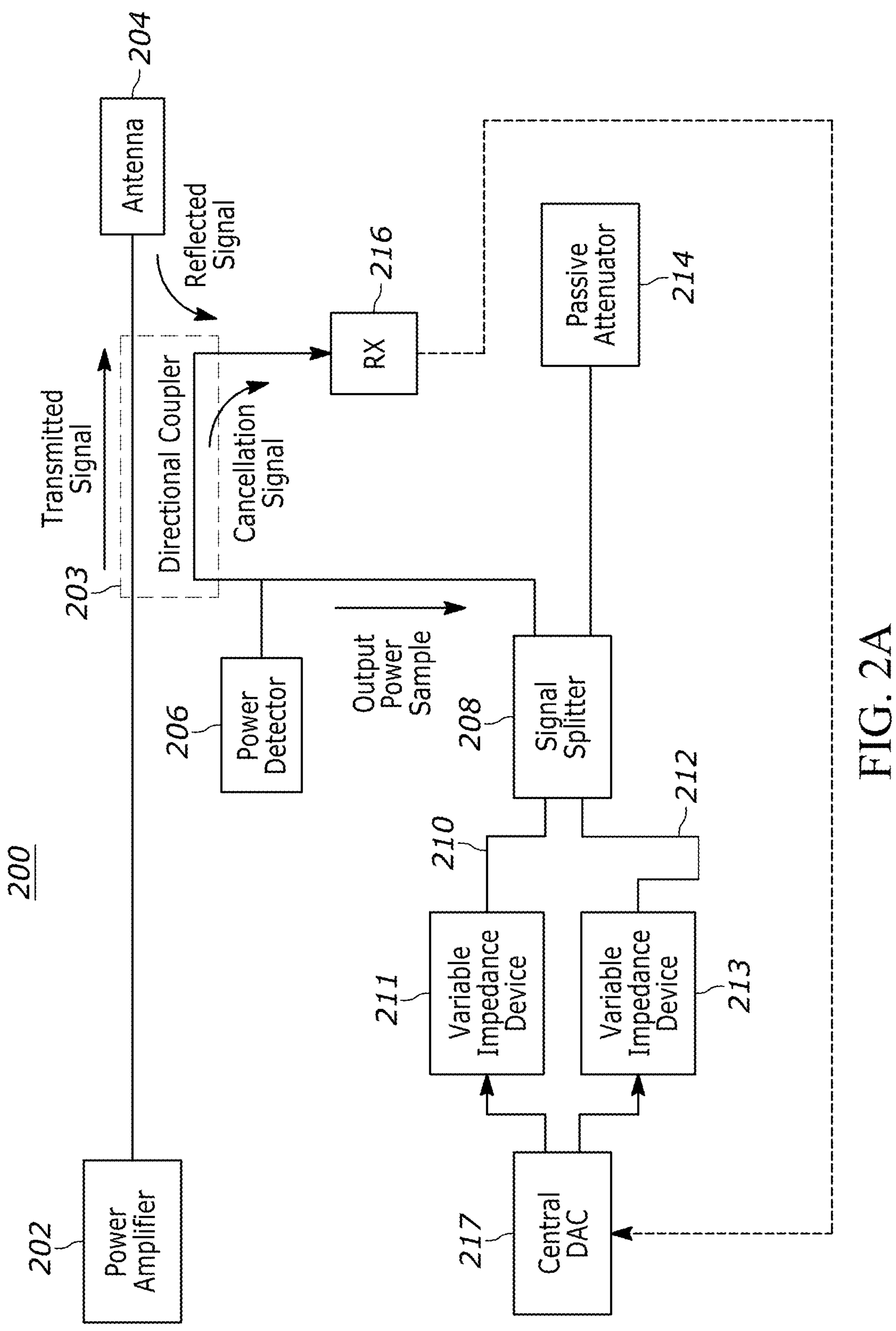
FIG. 2A depicts an example cancellation signal synthesizer circuit architecture, in accordance with various embodiments described herein.

FIG. 2A depicts an example cancellation signal synthesizer circuit architecture 200, in accordance with various embodiments described herein. Generally, the example cancellation signal synthesizer circuit architecture 200 is included in an RFID reader that transmits signals to RFID tags for tracking/locationing and/or other suitable purposes. As referenced herein, any/all of the power detector 206, the signal splitter 208, the variable impedance devices 211, 213, the central DAC 217, the receiving backend 216, and/or a passive attenuator 214 may be included as part of a "cancellation signal synthesizer" that is configured to generate cancellation signals, as described herein.

As depicted in FIG. 2A, a power amplifier 202 amplifies a signal that is transmitted by an antenna 204 of the RFID reader, thereby producing a reflected signal (echo) that is directed towards a receiving backend 216 by a directional coupler 203. The directional coupler 203 subsequently generates/outputs an output power sample that travels towards the signal splitter 208 and transmits a sample/portion of the reflected signal to the receiving backend 216. The output power sample generally indicates the current power, such that the output power sample represents a sample of the power output signal of the power amplifier 202 (e.g., a power amplifier output sample). The receiving backend 216 determines optimal phase and magnitude values for the cancellation signal based on the received reflected signal, as described herein, and causes the central DAC 217 to adjust the impedance values of the variable impedance devices 211, 213 to reflect at least a portion of the output power sample in a manner that generates the desired cancellation signal components (e.g., in-phase and quadrature components). These cancellation signal components then combine at the signal splitter 208, travel along the pathway of the output power sample, and pass through the directional coupler 203 to combine (and at least partially cancel) with the reflected signal.

More specifically, the signal splitter 208 splits the received output power sample along two pathways 210, 212. Generally speaking, the split signals of the output power sample traveling along the respective pathways 210, 212 interact with the variable impedance devices 211, 213 to create the cancellation signal components (e.g., in-phase signal component and quadrature signal component). The first pathway 210 leads to a first variable impedance device 211, and the second pathway 212 leads to a second variable impedance device 213. Importantly, the second pathway 212 includes an additional turn and/or other feature(s) resulting in a path length difference from the first pathway 210. This path length difference delays (i.e., adjusts the phase) the signal traveling along the second pathway 212 by approximately 45° relative to the signal traveling along the first pathway 210. This phase delay is duplicated when the cancellation signal components (e.g., in-phase and quadrature components) travel along the first and second pathways 210, 212 to the signal splitter 208 for combination into the cancellation signal. Accordingly, the cancellation signal components generated via the variable impedance devices 211, 213 reach the signal splitter 208 approximately 90° out of phase. As illustrated in FIG. 2A, the phase delay is achieved through, for example, controlling traces on a circuit board, but it should be appreciated that the phase delay may be accomplished via any suitable means (e.g., variable delay elements).

The receiving backend 216 receives the cancellation signal and the reflected signal via the directional coupler 203, determines the relevant/desired impedance value(s) of the variable impedance devices 211, 213 and drives the central digital-to-analog converter (DAC) 217 to supply the voltage/current necessary to achieve the relevant/desired impedance value(s) in the variable impedance devices 211, 213. In response to the impedance adjustments from the central DAC 217, the devices 211, 213 subsequently receive a split output power sample and return (e.g., reflect) cancellation component signals that are more optimally configured to cancel the reflected signal.

It should be appreciated that either component of the output power sample and/or the cancellation signal may be delayed with respect to the other component. Namely, the in-phase component or the quadrature component of the output power sample and/or the cancellation signal may be delayed relative to the other signal by traveling along the second pathway 212. Additionally, either pathway 210, 212 may be longer than the other pathway 210, 212 and/or otherwise delay one signal component with respect to the other signal component. For example, in certain instances, the first pathway 210 may be physically longer than the second pathway 212, such that the signal component traveling along the first pathway 210 is phase delayed by approximately 45° relative to the signal component traveling along the second pathway 212. Moreover, in certain instances, the output power sample, the cancellation signal, and/or the signal resulting from the combination of the output power sample and the cancellation signal is also sampled by a power detector 206, which can further inform determinations made by the receiving backend 216. The power detector 206 may, for example, be integrated in an integrated circuit (IC) of the RFID reader (e.g., an integrated RFID application-specific IC (ASIC)).

When the reflected signal and the cancellation signal reach the receiving backend 216, the signals may be converted from analog signals to digital signals and/or otherwise analyzed. The receiving backend 216 can then analyze relevant information (e.g., phase, amplitude) corresponding to the signal resulting from the combination of the reflected signal and the cancellation signal (also referenced herein as a "combined signal"), and thereby enable the receiving backend 216 to determine signal characteristics of a cancellation signal that will more completely cancel the reflected signal. Using this information, the receiving backend 216 estimates the magnitude and phase of the reflected signal and/or the combined signal, estimates or otherwise determines optimal/relevant impedance values for the variable impedance devices 211, 213 to generate the cancellation signal components, and provides these impedance values and/or information based on these impedance values as digital inputs to the central DAC 217.

The central DAC 217 converts these digital inputs to analog driving signals that drive the variable impedance devices 211, 213 at the corresponding voltage/current necessary to achieve the optimal/relevant impedance values. The variable impedance devices 211, 213 then reflect the respective components of the split output power sample to generate the corresponding cancellation signal components (e.g., in-phase or cosine and quadrature or sine components, respectively). These cancellation signal components then travel along the respective pathways 210, 212 to achieve combination at the signal splitter 208 as the cancellation signal. The cancellation signal then cancels the reflected signal when traveling towards the receiving baseband/backend 216 for further processing. In certain embodiments, the central DAC 217 may include at least two DACs, where each pathway 210, 212 and variable impedance device 211, 213 is associated with an individual DAC.

The receiving backend 216 may determine the signal characteristics of a cancellation signal in numerous ways. For example, the receiving backend 216 may receive the combined signal and digitize this signal into wave phase and magnitude representations. In certain embodiments, the receiving backend 216 may estimate these wave phase and magnitude values and may also utilize measurements from the power detector 206 to confirm and/or otherwise more accurately estimate the signal wave phases and magnitudes. The receiving backend 216 then locates these phase and magnitude representations/estimates in a lookup table (e.g., stored in associated memory of the RFID reader and/or remotely) to map the phase and magnitude values to an impedance value corresponding to the variable impedance devices 211, 213, as described herein in reference to FIG. 2C. In some embodiments, the lookup table may also or alternatively include reflection coefficients, from which the receiving backend 216 may estimate the impedance value(s).

To illustrate, the receiving backend 216 may determine signal characteristics of the cancellation signal by specifically determining quadrature signal characteristics and in-phase signal characteristics. The two pathways 210, 212 may correspond to the in-phase or quadrature components of the cancellation signal, respectively. For example, the first pathway 210 may correspond to the in-phase component of the cancellation signal, and the second pathway 212 may correspond to the quadrature component of the cancellation signal, or vice versa. Thus, the receiving backend 216 may determine signal characteristics for each of the in-phase and quadrature components and drive the central DAC 217 to adjust the impedance values of the variable impedance devices 211, 213 as necessary to create the in-phase and quadrature cancellation signal components. The in-phase and quadrature cancellation signal components then travel along the respective pathways 210, 212 and are combined at the signal splitter 208 to create the cancellation signal. The receiving backend 216 may adjust the impedance values of the variable impedance devices 211, 213 directly through values injected by the central DAC 217 and/or by, for example, adjusting a voltage bias applied to the variable impedance devices 211, 213, adjusting the current supplied to the variable impedance devices 211, 213, and/or any other suitable actions or combinations thereof.

As another example, the receiving backend 216 may estimate power levels of combined signal to directly generate an impedance value for the variable impedance devices 211, 213. Additionally, or alternatively, the receiving backend 216 may receive a power measurement from the power detector 206 and determine a magnitude and/or phase of the resulting cancellation signal that may best cancel the reflected signal. Accordingly, the receiving backend 216 may determine an optimal impedance value of one or both of the variable impedance devices 211, 213 that enables generation of the cancellation signal with the intended characteristics (e.g., phase, magnitude, etc.). The receiving backend 216 may then drive the central DAC 217 with a digital signal configured to cause the central DAC 217 to supply the voltage/current necessary for the variable impedance devices 211, 213 to have the optimal impedance value. Accordingly, when the output power sample components arrive at the variable impedance devices 211, 213 each component will be reflected to create the optimal cancellation signal components (e.g., in-phase and quadrature components) that generate the cancellation signal.

Further, the receiving backend 216 may iteratively receive measurements from the power detector 206 (or other suitable power detector) to iteratively estimate a power level associated with the reflected signal and/or the combined signal. The receiving backend 216 may then determine signal characteristics of the cancellation signal and adjust impedance values of the variable impedance devices 211, 213 through the central DAC 217. During subsequent iterations, the power measurement from the power detector 206 (or other suitable detector) may represent a decreasing power of the combined signal, indicating at least partial cancellation of the reflected signal by the generated cancellation signal(s). The receiving backend 216 may thus continue to determine signal characteristics of subsequent cancellation signals (e.g., a second cancellation signal, third cancellation signal, etc.) to continually decrease the power of the combined signal until a minimum reflected power threshold (e.g., a minimum error threshold) is satisfied and/or a timeout threshold is exceeded. Effectively, the iterative cancellation signal generation initiated by the receiving backend 216, central DAC 217, and variable impedance devices 211, 213 converges to a solution such that the power detector 206 measurement reaches a minimum when the convergence is achieved.

As a simplified example, the receiving backend 216 may iteratively evaluate power levels and/or other signal characteristics (e.g., phase, magnitude, amplitude) of the reflected signal and/or the combined signal three times to generate three cancellation signals until the power measurement of the receiving backend 216, the power detector 206, and/or other suitable measurement source(s) indicates a power of the reflected signal and/or the combined signal that is less than the minimum reflected power threshold. At this point, the receiving backend 216 may cease generating cancellation signals, as the power of the reflected signal and/or the combined signal is sufficiently low such that the RFID reader can operate at the required sensitivity.

More specifically, in an example implementation, the power measurement from the receiving backend 216, the power detector 206, and/or other suitable measurement source(s) is mapped to an initial cancellation signal magnitude. Candidate cancellation signals may be defined at intervals over a 360-degree phase (e.g., 30-degree intervals) with magnitudes at intervals over and under the initial cancellation signal magnitude (e.g., at intervals of 1 dBm over a range 2 dBm above and 2 dBm below the initial cancellation signal magnitude). Respective reflected signal and/or combined signal power level measurements are performed for each candidate cancellation signal, to identify a candidate cancellation signal with the lowest reflected signal power level and/or the lowest combined signal power level (i.e., a candidate cancellation signal that most effectively cancels out the reflection/echo phenomenon). If the candidate cancellation signal produces a reflected signal power level and/or a combined signal power level below a threshold, the receiving backend 216 may conclude/stop evaluating subsequent power measurements of the reflected signal and/or the combined signal.

In another example implementation, the receiving backend 216 includes a "finer" search, i.e., containing candidate cancellation signals more closely spaced around an initial cancellation signal. For example, candidate cancellation signal phases may be spaced at 5-degree intervals in a range 60 degrees above and below a phase of the initial cancellation signal. Candidate cancellation signal power levels may be spaced at 0.5 dBm intervals in a range 1 dBm above and below a power level of the initial cancellation signal. Similarly to the comparatively "coarse" searching described previously, respective reflected signal power level and/or combined signal power level measurements are performed for each candidate cancellation signal, to identify a candidate cancellation signal with the lowest reflected signal power level and/or the lowest combined signal power level (i.e., a candidate cancellation signal that most effectively cancels out the reflection/echo phenomenon). Additionally, if the candidate cancellation signal produces a reflected signal power level and/or a combined signal power level below a threshold, the receiving backend 216 may conclude/stop evaluating subsequent power measurements of the reflected signal and/or the combined signal.

In some example implementations, the receiving backend 216 combines "coarse" and "fine" searching techniques. For example, the receiving backend 216 may perform a first "coarse" search to define an initial cancellation signal, e.g., a particular cancellation signal phase and power level to search more closely around in a second "fine" search to identify the cancellation signal most effective in cancelling the reflected signal. Still other implementations are possible. For example, where example candidate cancellation signal search ranges/intervals are described above, other search ranges/intervals are possible based on design preference.

As illustrated in FIG. 2A, the example cancellation signal synthesizer circuit architecture 200 also includes a passive attenuator 214. The passive attenuator 214 generally provides a fixed or variable attenuation of the cancellation signal/components to help match the impedance necessary to generate the cancellation signal, as determined by the receiving backend 216, and/or to normalize the impedance. The passive attenuator 214 may be a voltage attenuator that attenuates voltage levels and/or a power attenuator that attenuates power levels. In either case, the passive attenuator 214 can provide fixed attenuation levels or variable attenuation levels, depending on the design characteristics and implementation of the cancellation signal synthesizer.

Figure 2B:
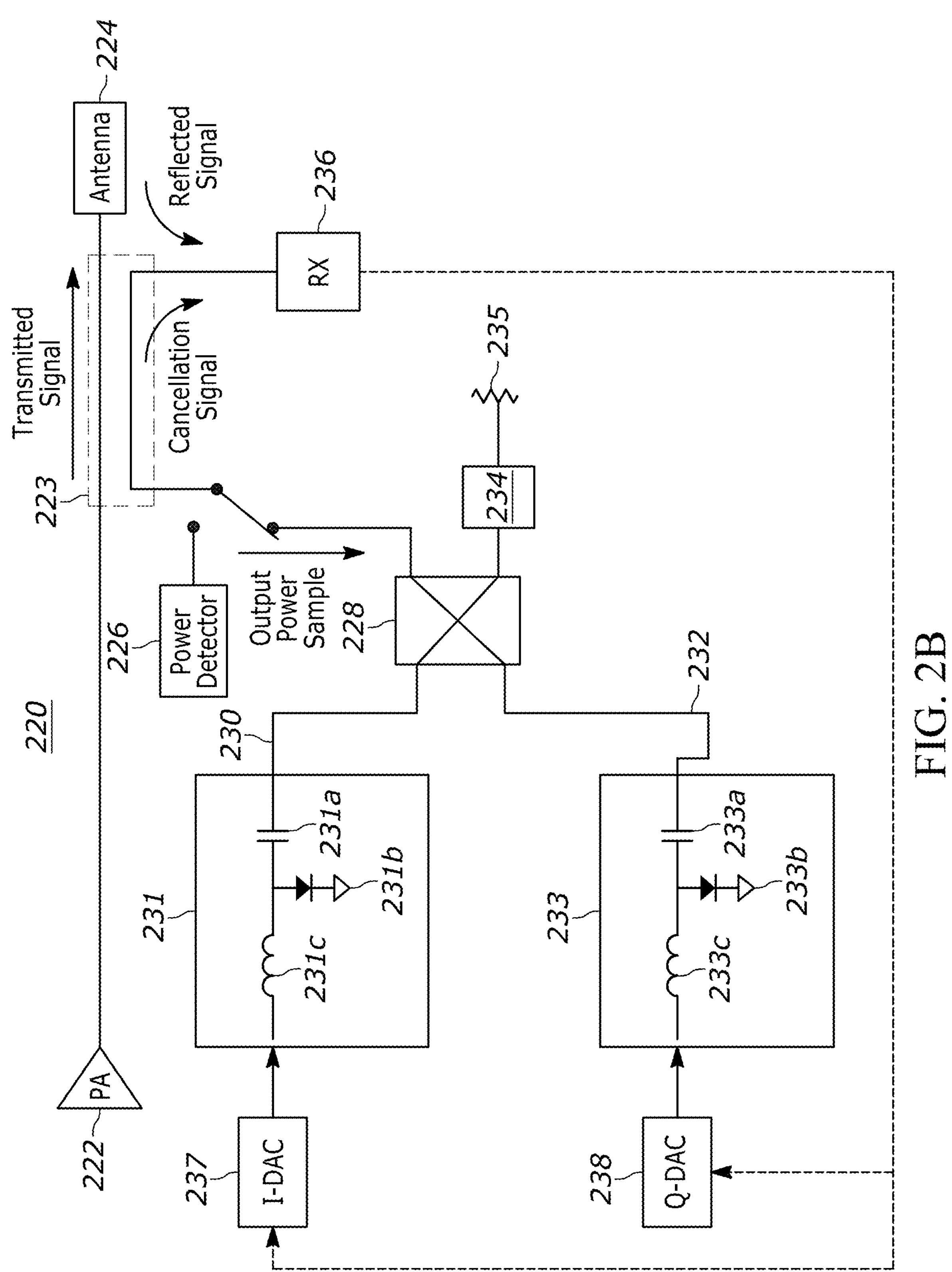
FIG. 2B depicts another example cancellation signal synthesizer circuit architecture, in accordance with various embodiments described herein.

More generally, the components of the example cancellation signal synthesizer circuit architecture 200 may be or include a variety of real-world devices arranged in various configurations to achieve the cancellation signal generation described herein. As an example, FIG. 2B depicts another example cancellation signal synthesizer circuit architecture 220, in accordance with various embodiments described herein. Where similar components to those described with regard to FIG. 2A are shown in FIG. 2B, it should be understood that the components may operate in a similar manner as described with respect to FIG. 2A, unless indicated otherwise herein.

Similar to the architecture 200, the example cancellation signal synthesizer circuit architecture 220 includes a power amplifier 222 that amplifies and transmits a signal towards an antenna 224 for transmission to proximate RFID tags. This transmitted signal reflects (i.e., is not transmitted by the antenna 224) and returning signals from the RFID tags and other proximate objects include various error signals (i.e., noise), all of which contributes to the reflected signal. This reflected signal is directed by a directional coupler 223 to the receiving backend 236, where the reflected signal ultimately combines with a cancellation signal to at least partially cancel the reflected signal.

To generate the cancellation signal, the directional coupler 223 also generates an output power sample for transmission towards the signal splitter 228. The output power sample generally indicates the current power, such that the output power sample represents a sample of a power output signal from the power amplifier 222 (e.g., a power amplifier output sample). This output power sample reaches the signal splitter 228, where the output power sample is split into two signals that travel along a first pathway 230 and a second pathway 232, respectively. Each signal reaches a respective variable impedance device 231, 233, which may be or include a capacitor 231*a*, 233*a*, a PIN diode 231*b*, 233*b*, and an inductor 231*c*, 233*c*. The inductors 231*c*, 233*c* are generally in series with the PIN diodes 231*b*, 233*b* and the capacitors 231*a*, 233*a*, and as a result, cancel the low bias capacitance of the PIN diodes 231*b*, 233*b* and decouples the signals received at the variable impedance devices 231, 233 to isolate high-frequency signals and minimize interference and noise.

When the output power sample components reach the variable impedance devices 231, 233, the output power sample components reflect from the devices 231, 233 in a manner that adjusts the characteristics of the output power sample components to generate the cancellation signal components. These cancellation signal components travel along the respective pathways 230, 232 to the signal splitter 228 to be combined into the cancellation signal. At this point, the cancellation signal is directed back through the directional coupler 223, where it is combined with the reflected signal to at least partially cancel the reflected signal. This combination of the reflected signal and the cancellation signal travels towards the receiving baseband/backend 236 for further (e.g., iterative) processing to continue minimizing the power level of the combination, as described herein.

Accordingly, the combined signal (e.g., combination of the cancellation signal and the reflected signal) is received at a receiving backend 236, which analyzes the components (e.g., in-phase and quadrature components) of the combined signal and/or the reflected signal to determine impedance adjustments to the variable impedance devices 231, 233 required to generate cancellation signal components configured to more fully cancel the reflected signal. The receiving backend 236 may determine these impedance adjustments using a lookup table and/or in any other suitable manner, as described herein. The receiving backend 236 then drives the DACs 237, 238 based on the determined impedance adjustments to adjust the impedance of the respective variable impedance devices 231, 233 to generate the cancellation signal components.

The example cancellation signal synthesizer circuit architecture 220 also includes a passive attenuator comprised of a first attenuation device 234 and a second attenuation device 235 (e.g., a 50-ohm resistor). In certain embodiments, the first attenuation device 234 is a pi pad that comprises two series resistors connected to the input and output ports, with a shunt resistor connected between them. The cancellation signal and/or the power amplifier output samples (e.g., output power samples) may pass through one series resistor, then split into two paths, such as passing through the shunt resistor and continuing through the second series resistor before reaching the second attenuation device 235. Additionally, or alternatively, the first attenuation device 234 may be a pi reactive matching circuit, which is configured to set an impedance offset that can normalize the local circuit impedance to the system impedance. For example, the first attenuation device 234 may provide an impedance offset of approximately 50 Ohms.

Any/all of the power detector 226, the signal splitter 228, the two pathways 230, 232, the variable impedance devices 231, 233, the DACs 237, 238, the receiving backend 236, and/or the first and second attenuation devices 234, 235 may be included as part of a "cancellation signal synthesizer" that is configured to generate cancellation signals, as described herein. In this example architecture 220, the first DAC 237 is an in-phase DAC 237 ("I-DAC") configured to adjust supply parameters (e.g., voltage, current, etc.) of a variable impedance device 231 to generate an in-phase component of the cancellation signal. The second DAC 238 is a quadrature DAC 238 ("Q-DAC") configured to adjust supply parameters (e.g., voltage, current, etc.) of a variable impedance device 233 to generate a quadrature component of the cancellation signal.

The receiving backend 236 may determine the relevant component signal characteristics and drive the relevant DACs 237, 238 as necessary to adjust impedance values of the variable impedance devices 231, 233. In certain embodiments, the receiving backend 236 may adjust a voltage/current bias setting of the PIN diodes **231*b*, 233*b* to achieve the required impedance of the variable impedance devices 231, 233. Advantageously, PIN diodes have significantly higher resilience to large voltage spikes/changes than DTCs. Thus, by incorporating PIN diodes into the variable impedance devices 231, 233, the architecture 220 avoids the voltage lockouts required in conventional reflected signal cancellers utilizing DTCs, and thereby does not limit the number of available solutions (i.e., signal characteristics) to generate a cancellation signal. Of course, it should be appreciated that the variable impedance devices 231, 233** may include various alternative components, such as field effect transistors (FETs), bipolar junction transistors (BJTs), and/or any other active impedance device(s) or combinations thereof.

In certain embodiments, the receiving backend 236 may utilize pulse width modulation when generating the cancellation signal. Namely, the receiving backend 236 may utilize pulse width modulation to control the direct current (DC) levels output by the I-DAC 237 and/or the Q-DAC 238 to drive the variable impedance device 231 and/or the variable impedance device 233. As a result, the I-DAC 237 and/or the Q-DAC 238 generate the relevant impedance value(s) at the variable impedance device 231 and/or device 233 to create the relevant cancellation signal component(s) (e.g., in-phase and/or quadrature cancellation signal components).

Moreover, the two pathways 230, 232 illustrated in the architecture 220 of FIG. 2B include a path length difference resulting in a phase delay between the two signals traveling along the pathways 230, 232 at any given time. For example, the second pathway 232 includes an additional turn that lengthens the path traveled by the signal traveling along the second pathway 232 relative to the signal traveling along the first pathway 230. As previously mentioned, this path/length difference between the two pathways 230, 232 may be achieved in a variety of manners, including physically lengthening the distance between the signal splitter 208 and the second variable impedance device 233 on a PCB relative to the distance between the signal splitter 208 and the first variable impedance device 231 and/or incorporating a delay component into the second pathway 232 to delay the signal.

The signal traveling along the second pathway 232 may experience a phase delay of approximately 45° relative to the signal traveling along the first pathway 230. When the split signals travel along the respective pathways 230, 232 interact with the variable impedance devices 231, 233 to generate the cancellation signals, the resulting cancellation signal components (e.g., in-phase and quadrature components) will have an approximate 45° relative phase difference. Thus, when the cancellation signal components travel along the respective pathways 230, 232, the component traveling along the second pathway 232 is again phase delayed by approximately 45° relative to the component traveling along the first pathway 230, such that the components reach the signal splitter 228 approximately 90° out-of-phase. In this manner, the cancellation signal components will appropriately combine at the signal splitter 228 to create the cancellation signal.

Additionally, and as previously mentioned, the receiving backend 236 may iteratively receive measurements from the power detector 226, determine power independently, and/or utilize any other suitable detector to iteratively estimate the reflected signal power level and/or the combined signal power level, determine signal characteristics of the cancellation signal, and adjust impedance values of the variable impedance devices 211, 213. During subsequent iterations, the power measurement from receiving backend 236, the power detector 226, and/or other suitable measurement source(s) may represent a decreasing power of the reflected signal and/or the combined signal, indicating at least partial cancellation of the reflected signal by the generated cancellation signal(s). The receiving backend 236 may thus continue to determine signal characteristics of subsequent cancellation signals (e.g., a second cancellation signal, third cancellation signal, etc.) to continually decrease the power of the reflected signal and/or the combined signal until a minimum reflected power threshold (e.g., a minimum error threshold) is satisfied and/or a timeout threshold is exceeded.

In particular, the receiving backend 236 may iteratively determine signal characteristics for an in-phase component and a quadrature component of the cancellation signal and may determine the impedance value(s) for the variable impedance devices 231, 233 that will yield those signal characteristics in the cancellation signal (e.g., via lookup table, power estimation, etc.). Accordingly, the receiving backend 236 may iteratively generate digital signals configured to cause the I-DAC 237 and/or the Q-DAC 238 to supply the voltage/current necessary to achieve the impedance value(s) in the variable impedance device 231 and/or the variable impedance device 233 that will yield the relevant/desired cancellation signal components to ultimately generate the cancellation signal.

Figure 2C:
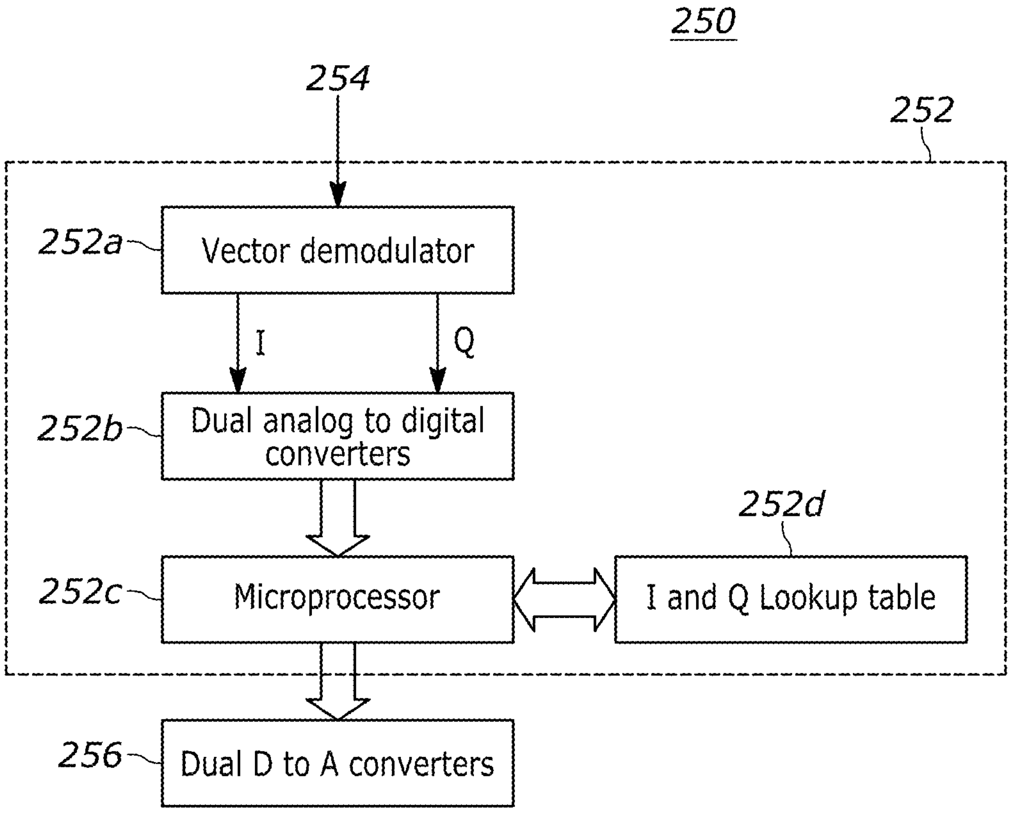
FIG. 2C depicts an example receiving backend signal flow included as part of a cancellation signal synthesizer circuit architecture, in accordance with various embodiments described herein.

FIG. 2C depicts an example receiving backend signal flow 250 included as part of a cancellation signal synthesizer circuit architecture (e.g., architecture 200, 220), in accordance with various embodiments described herein. The receiving backend signal flow 250 generally illustrates the flow of various signals through a receiving backend 252 (e.g., receiving backend 216, 236), from receiving a reflected signal and a cancellation signal (signal 254) to outputting impedance adjustment values to a DAC 256 (e.g., central DAC 217, I-DAC 237, Q-DAC 238).

As illustrated in FIG. 2C, the receiving backend 252 receives a combination of the reflected signal and the cancellation signal (signal 254), as generated by the cancellation signal synthesizers described herein in reference to FIGS. 2A and 2B. This signal 254 generally informs the receiving backend 252 regarding the signal characteristics required of subsequent cancellation signals to more fully cancel the reflected signal. To make this determination, the receiving backend 252 includes a vector demodulator 252*a* that demodulates the received signal 254 into an in-phase ("I") component and a quadrature ("Q") component. The receiving backend 252 then converts these analog I and Q components into digital signals using the analog to digital converter 252*b*. In certain embodiments, the analog to digital converter 252*b* may be a dual converter to independently convert the I and Q components from analog to digital signals. The receiving backend 252 the analyzes the digital signals of the I and Q components using a microprocessor 252*c* in conjunction with an I and Q lookup table 252*d* to determine the relevant reflection coefficients and/or impedance values for the variable impedance devices (e.g., devices 211, 213, 231, 233).

The I and Q lookup table 252*d* generally includes predetermined reference impedance values for each frequency associated with the variable impedance devices to generate a cancellation signal that more fully cancels the reflected signal. These reference impedance values may be divided between the I and Q components, such that the receiving backend 252 may provide specific impedance value adjustments to the respective variable impedance devices configured to generate the I and Q cancellation signal components. Thus, the microprocessor 252*c* accesses, retrieves, and/or otherwise utilizes the values stored in the lookup table 252*d* to generate impedance value adjustment signals and transmit those adjustment signals to the DAC 256. In certain instances, the DAC 256 may be a dual DAC that collectively represents the respective DACs (e.g., I-DAC 237, Q-DAC 238) configured for outputting analog impedance value adjustment signals to the respective variable impedance devices (e.g., devices 231, 233).

Figure 3:
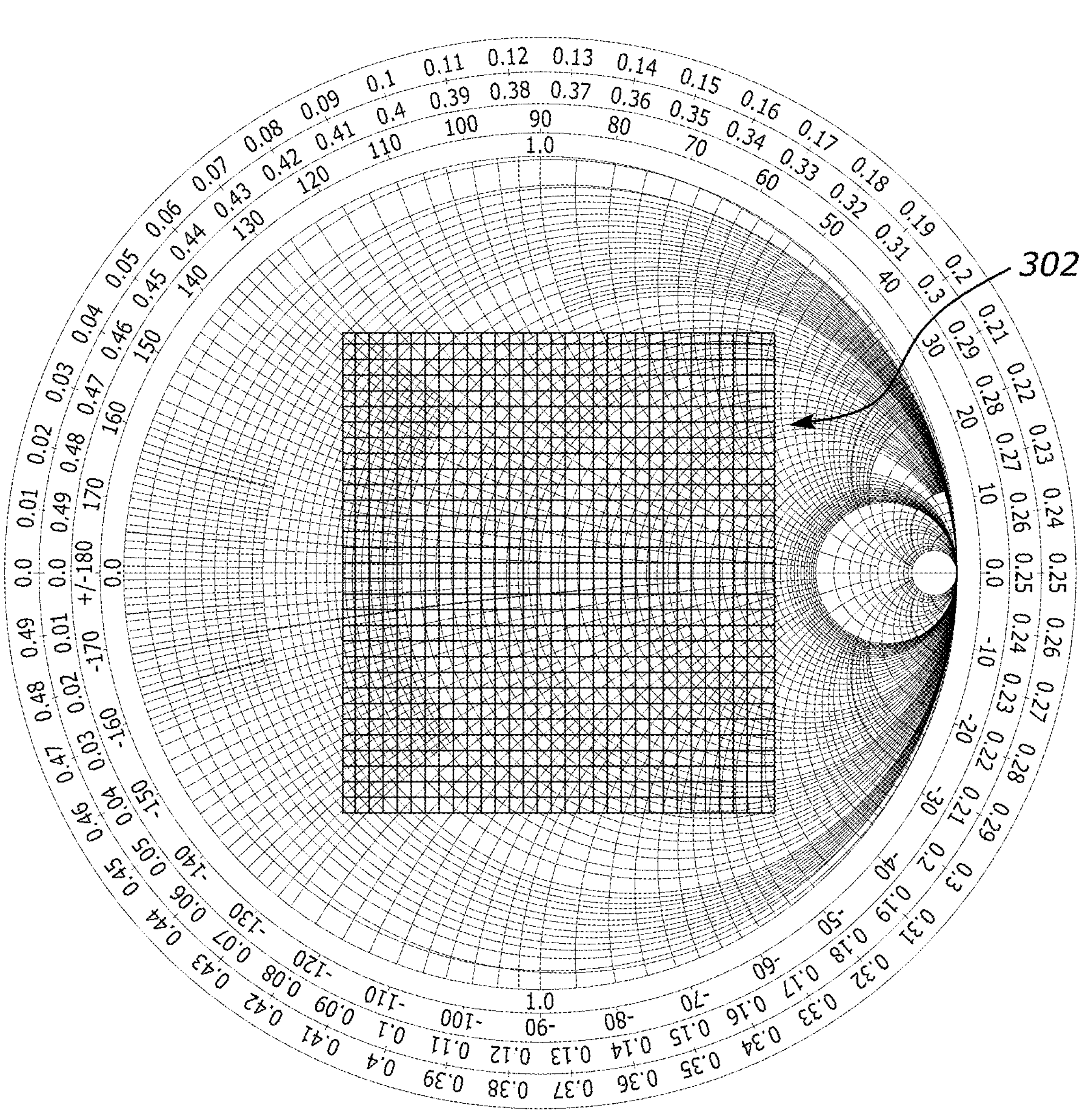
FIG. 3 depicts a Smith chart representing composite cancellation signals that the cancellation signal synthesizer is configured to generate, in accordance with various embodiments described herein.

Example Smith Chart Indicating Cancellation Signal Capabilities of Cancellation Signal Synthesizers FIG. 3 depicts a Smith chart 300 representing composite cancellation signals that the cancellation signal synthesizer is configured to generate, in accordance with various embodiments described herein. In particular, the Smith chart 300 includes a plurality of S11 parameter values 302 where both the in-phase and quadrature vectors are stepped, based on the capabilities of the cancellation signal synthesizers described herein. As previously discussed, a cancellation signal synthesizer of the present disclosure may be or include any/all of the components described herein in reference to FIGS. 2A and/or 2B. For example, a cancellation signal synthesizer may be or include any/all of a power detector (e.g., 206, 226), a signal splitter (e.g., 208, 228), a variable impedance device (e.g., 211, 213, 231, 233), a DAC (e.g., 217, 237, 238), a receiving backend (e.g., 216, 236), multiple signal pathways (e.g., 210, 212, 230, 232) that may introduce a phase delay, and/or a passive attenuator (e.g., 214, 234, 235).

Regardless, the plurality of S11 parameter values 302 is a matrix of I/Q values that cover the cancellation signals of interest. Notably, the plurality of S11 parameter values 302 includes a large number of paths in every quadrant of the Smith chart. In fact, the field of solutions represented by the S11 parameter values 302 resulting from the cancellation signal synthesizers of the present disclosure are capable of cancelling a full spectrum of reflection coefficients up to at least 0.45 Γ ("gamma"), which conventional techniques were generally unable to accomplish. Thus, the Smith chart 300 visually indicates the expanded capability of the cancellation signal synthesizers of the present disclosure relative to the conventional reflected signal cancellers (e.g., as illustrated by the Smith chart of FIG. 1).

Example Environment Including Assembly and Receiver

Figure 4:
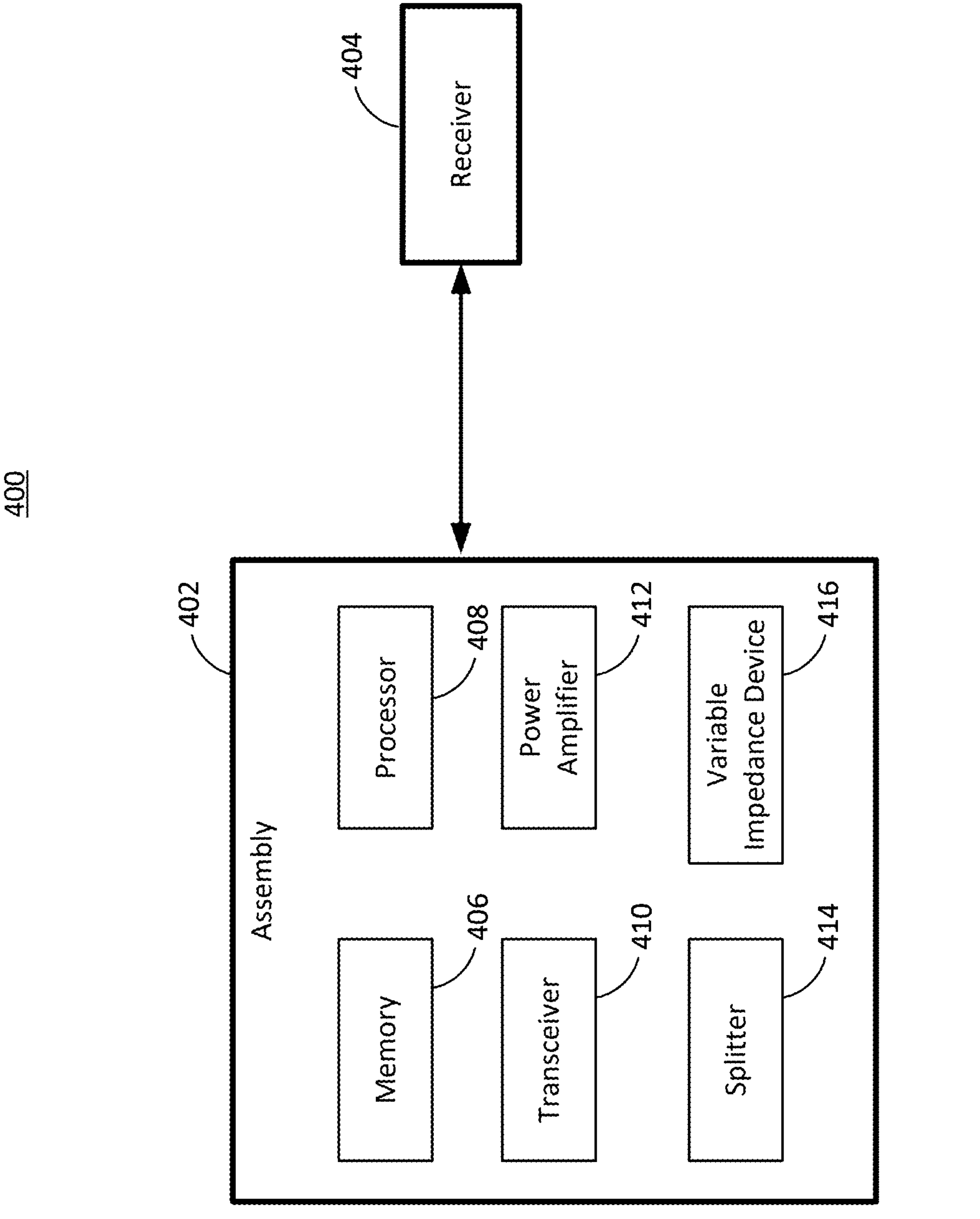
FIG. 4 depicts a block diagram of an example environment including an assembly and a receiver, in accordance with various embodiments described herein.

FIG. 4 depicts a block diagram of an example environment 400, components of which may be configured to implement a cancellation signal synthesizer circuit, in accordance with techniques of this disclosure.

The environment 400 includes an assembly 402, which may for example be at least a portion of an RFID reader, e.g., as described with respect to FIGS. 2A and/or 2B. The environment 400 also includes a receiver 404 configured to receive signals transmitted by the assembly 402 via communications represented by the arrow connecting the assembly 402 and the receiver 404. The receiver 404 may, for example, be an RFID tag including an antenna connected to an integrated circuit. In some aspects, the receiver 404 may be an RFID tag including still additional components, e.g., a battery and/or one or more sensors. Although only one receiver 404 is depicted in FIG. 4, the environment 400 may include two, three, four or more receivers 404 (e.g., multiple RFID tags in the environment 400).

The assembly 402 includes a memory 406 (i.e., one or more memories, such as one or more non-transitory memories). The memory 406 stores instructions that, when executed by a processor 408 (i.e., one or more processors), cause the assembly 402 to perform actions attributed thereto (e.g., actions of one or more RFID readers described in this disclosure). Transmission of signals between the transceiver 410 and an antenna of the receiver 404 may correspond to RFID communications between the assembly 402 and the receiver 404.

The assembly 402 may further include any of the RFID reader circuitry and/or other components described with respect to FIGS. 2A and/or 2B. For example, the assembly 402 includes a power amplifier 412, a splitter 414 (e.g., an RF splitter), and a variable impedance device 416. At least the splitter 414 and the variable impedance device 416 may operate as part of a cancellation signal synthesizer, as described herein. Thus, when the assembly 402 transmits signals to the receiver 404, the splitter 414 and variable impedance device 416 may receive the reflected (i.e., echo) signal associated with the transmitted signal and operate as described herein to generate and/or otherwise facilitate generation of cancellation signals (i.e., reflection vectors) to at least partially cancel the reflected signal.

The environment 400 may include additional and/or alternate components, in various possible aspects.

Example Method

Figure 5:
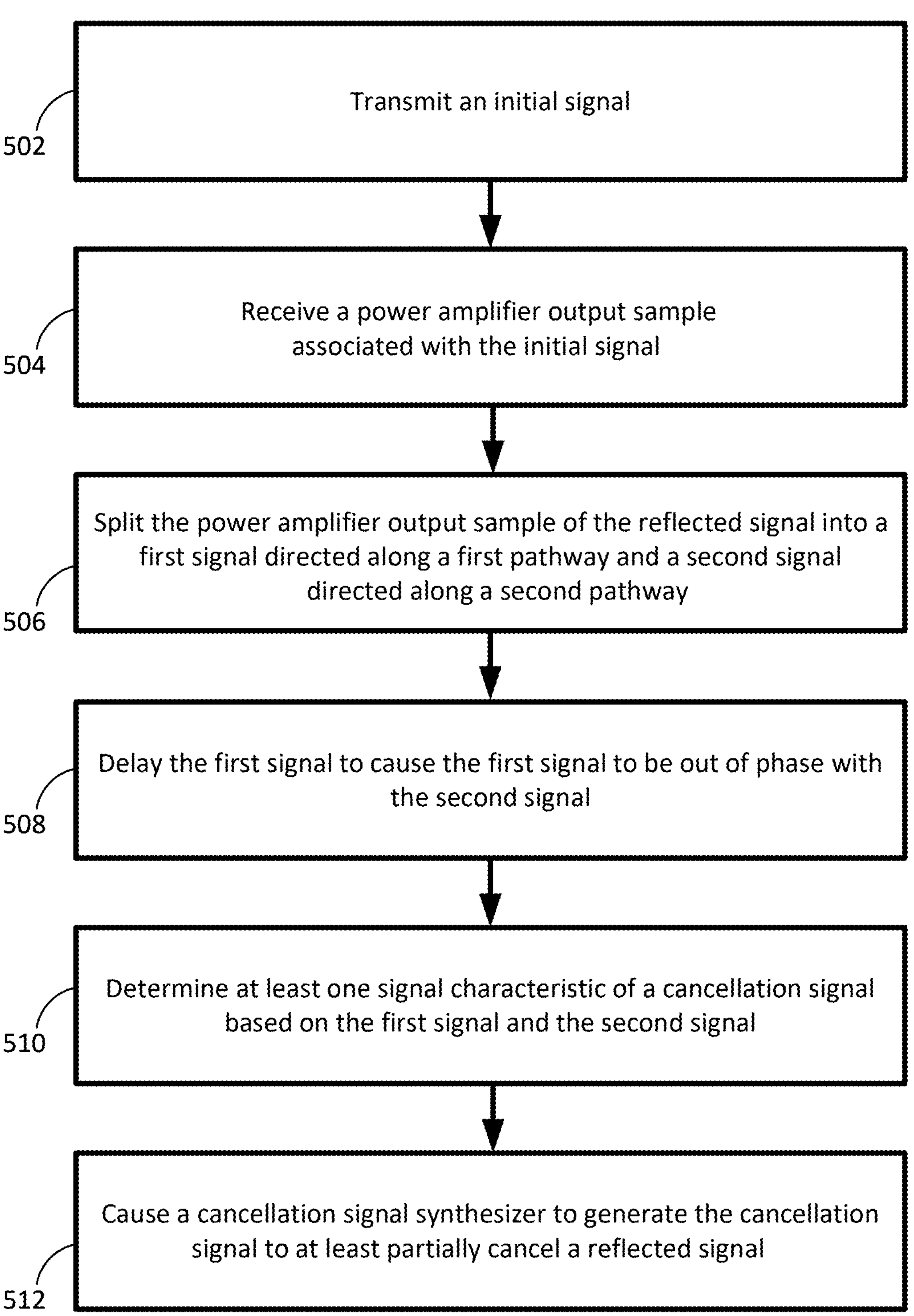
FIG. 5 depicts a block diagram of an example method, in accordance with various embodiments described herein.

FIG. 5 depicts a block diagram of an example method 500, in accordance with some embodiments of the present disclosure. Actions of the method 500 may be implemented, for example, by an assembly such as the architecture 200 of FIG. 2A, the architecture 220 of FIG. 2B, and/or the assembly 402 of FIG. 4 (e.g., via one or more processors of the assembly executing instructions stored at one or more non-transitory memories of the assembly). Particularly, in some aspects, the method 500 of FIG. 5 is implemented in an assembly (e.g., an RFID reader) via one or more processors executing instructions stored on one or more memories communicatively coupled to the one or more processors.

The method 500 includes transmitting, by a transceiver, an initial signal (block 502). The method 500 further includes receiving a power amplifier output sample associated with the initial signal (block 504). The method 500 further includes splitting the power amplifier output sample into a first signal directed along a first pathway and a second signal directed along a second pathway (block 506).

The method 500 also includes delaying the first signal to cause the first signal to be out of phase with the second signal (block 508). In certain embodiments, the first signal or the second signal may be delayed to be out of phase with the first signal or the second signal, respectively. The method 500 further includes determining, by one or more processors, at least one signal characteristic of a cancellation signal based on the first signal and the second signal (block 510). The method 500 further includes causing, by the one or more processors, a cancellation signal synthesizer to generate the cancellation signal to at least partially cancel a reflected signal (block 512).

In some aspects, the cancellation signal synthesizer includes a variable impedance device, and determining the at least one signal characteristic of the cancellation signal further includes: estimating, by the one or more processors based on the first signal and the second signal, a phase and a magnitude of the reflected signal; determining, by the one or more processors using a lookup table, the at least one signal characteristic based on the phase and the magnitude; and adjusting, by the one or more processors, an impedance value of the variable impedance device to enable the cancellation signal synthesizer to generate the cancellation signal.

In some aspects, determining the at least one signal characteristic of the cancellation signal further includes: determining, by the one or more processors, quadrature signal characteristics of a quadrature signal based on the first signal; and determining, by the one or more processors, in-phase signal characteristics of an in-phase signal based on the second signal, and wherein the cancellation signal is a combination of the quadrature signal and the in-phase signal.

In some aspects, the cancellation signal is a first cancellation signal, the reflected signal is a first reflected signal, the cancellation signal synthesizer includes a variable impedance device, and after the cancellation signal synthesizer generates the first cancellation signal, the method 500 further includes: (a) estimating, by the one or more processors, a power level of a second reflected signal; (b) determining, by the one or more processors, at least one signal characteristic of a second cancellation signal based on the power level; and (c) adjusting, by the one or more processors, an impedance value of the variable impedance device to enable the cancellation signal synthesizer to generate the second cancellation signal. In these aspects, the method 500 further includes: (d) iteratively performing steps (a)-(c) until a minimum reflected power threshold is satisfied or a timeout threshold is exceeded.

In some aspects, a distance of the first pathway is different than a distance of the second pathway. Further, in certain aspects, the first signal traveling along the first pathway causes the first signal to be approximately 45° out of phase with the second signal.

In some aspects, causing the cancellation signal synthesizer to generate the cancellation signal further includes: causing, by the one or more processors, the cancellation signal synthesizer to utilize pulse width modulation when generating the cancellation signal.

In some aspects, the cancellation signal synthesizer includes a variable impedance device that is at least one of a pin diode, a field effect transistor (FET), and/or a bipolar junction transistor (BJT).

The method 500 may include still additional and/or alternate actions, including any suitable actions described in this disclosure, in various possible aspects. The method 500 may include fewer actions, in some possible aspects.

Additional Considerations

Portions of the present disclosure describe RFID communication techniques most commonly associated with passive RFID tags, which traditionally do not have an internal power source and must be energized by the interrogation signal from an RFID reader to transmit signals back to the RFID reader. However, it should be appreciated that benefits attributed to techniques of this disclosure be achieved in RFID systems involving passive, semi-passive, and/or active RFID tags. Use cases involving any of these types of RFID tags typically include signal transmissions by the RFID reader and detection of responses from one or more RFID tags, thus present similar needs for effective reflective vector synthesis (i.e., cancellation signal synthesis) to achieve maximal echo cancellation by the RFID reader.

The signal transmissions described in this disclosure may utilize any of various radio frequencies, for example in the low frequency (LF) range (30-500 kilohertz (KHz), or more particularly 125-134 KHz), the high frequency (HF) range (3-30 megahertz (MHz), or more particularly 13.56 MHz), the ultra-high frequency (UHF) range (300-960 MHZ, or more particularly 433 MHZ), and/or microwave frequencies (e.g., 2.45 gigahertz (GHz) or 5.6 GHz).

Further information regarding RFID systems, including commands, communications, and computing architectures traditionally involved therein, may be found in the specification for RFID air interfaces (GS1 Global. (2015). EPC™ Radio-Frequency Identity Protocols Generation-2 UHF RFID. https [colon]//www[dot]gs1[dot]org/sites/default/files/docs/epc/uhfc1g2_2_0_0_standard_20131101[dot]pdf).

In the foregoing specification, specific embodiments/aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations/aspects should not be interpreted as mutually exclusive, and should instead be understood as potentially combinable if such combinations are permissive in any way. In other words, any feature disclosed in any the of aforementioned embodiments/examples/implementations may be included in any of the other aforementioned embodiments/examples/implementations/aspects.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms “comprises,” “comprising,” “has,” “having,” “includes,” “including,” “contains,” “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a,” “has . . . a,” “includes . . . a,” “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially,” “essentially,” “approximately,” “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way but may also be configured in ways that are not listed.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An assembly comprising:

a transceiver configured to transmit an initial signal;

a cancellation signal synthesizer comprising a variable impedance device, the cancellation signal synthesizer being configured to:

receive a power amplifier output sample associated with the initial signal, split the power amplifier output sample into a first signal directed along a first pathway and a second signal directed along a second pathway, and delay the first signal to cause the first signal to be out of phase with the second signal;

one or more processors; and one or more memories communicatively coupled to the transceiver, the cancellation signal synthesizer, and the one or more processors storing instructions that, when executed by the one or more processors, cause the assembly to:

determine at least one signal characteristic of a cancellation signal based on the first signal and the second signal, and cause the cancellation signal synthesizer to generate the cancellation signal to at least partially cancel a reflected signal, wherein the cancellation signal is a first cancellation signal, the reflected signal is a first reflected signal, and after the cancellation signal synthesizer generates the first cancellation signal, the instructions further cause the assembly to:

(a) estimate a power level of a second reflected signal;

(b) determine at least one signal characteristic of a second cancellation signal based on the power level;

(c) adjust an impedance value of the variable impedance device to enable the cancellation signal synthesizer to generate the second cancellation signal; and (d) iteratively perform steps (a)-(c) until a minimum reflected power threshold is satisfied or a timeout threshold is exceeded.

2. The assembly of claim 1, wherein the instructions further cause the assembly to determine the at least one signal characteristic of the cancellation signal by:

estimating, based on the first signal and the second signal, a phase and a magnitude of the reflected signal;

determining, using a lookup table, the at least one signal characteristic based on the phase and the magnitude; and adjusting an impedance value of the variable impedance device to enable the cancellation signal synthesizer to generate the cancellation signal.

3. The assembly of claim 1, wherein the instructions further cause the assembly to determine the at least one signal characteristic of the cancellation signal by:

determining quadrature signal characteristics of a quadrature signal based on the first signal; and determining in-phase signal characteristics of an in-phase signal based on the second signal, and wherein the cancellation signal is a combination of the quadrature signal and the in-phase signal.

4. The assembly of claim 1, wherein a distance of the first pathway is different than a distance of the second pathway.

5. The assembly of claim 4, wherein the first signal traveling along the first pathway causes the first signal to be approximately 45° out of phase with the second signal.

6. The assembly of claim 1, wherein the instructions further cause the assembly to cause the cancellation signal synthesizer to utilize pulse width modulation when generating the cancellation signal.

7. The assembly of claim 1, wherein the variable impedance device is at least one of a pin diode, a field effect transistor (FET), or a bipolar junction transistor (BJT).

8. A method comprising:

transmitting, by a transceiver, an initial signal;

receiving a power amplifier output sample associated with the initial signal;

splitting the power amplifier output sample into a first signal directed along a first pathway and a second signal directed along a second pathway;

delaying the first signal to cause the first signal to be out of phase with the second signal;

determining, by one or more processors, at least one signal characteristic of a cancellation signal based on the first signal and the second signal; and causing, by the one or more processors, a cancellation signal synthesizer to generate the cancellation signal to at least partially cancel a reflected signal, wherein the cancellation signal is a first cancellation signal, the reflected signal is a first reflected signal, the cancellation signal synthesizer includes a variable impedance device, and after the cancellation signal synthesizer generates the first cancellation signal, the method further comprises:

(a) estimating, by the one or more processors, a power level of a second reflected signal;

(b) determining, by the one or more processors, at least one signal characteristic of a second cancellation signal based on the power level;

(c) adjusting, by the one or more processors, an impedance value of the variable impedance device to enable the cancellation signal synthesizer to generate the second cancellation signal; and (d) iteratively performing steps (a)-(c) until a minimum reflected power threshold is satisfied or a timeout threshold is exceeded.

9. The method of claim 8, wherein the cancellation signal synthesizer includes a variable impedance device, and determining the at least one signal characteristic of the cancellation signal further comprises:

estimating, by the one or more processors based on the first signal and the second signal, a phase and a magnitude of the reflected signal;

determining, by the one or more processors using a lookup table, the at least one signal characteristic based on the phase and the magnitude; and adjusting, by the one or more processors, an impedance value of the variable impedance device to enable the cancellation signal synthesizer to generate the cancellation signal.

10. The method of claim 8, wherein determining the at least one signal characteristic of the cancellation signal further comprises:

determining, by the one or more processors, quadrature signal characteristics of a quadrature signal based on the first signal; and determining, by the one or more processors, in-phase signal characteristics of an in-phase signal based on the second signal, and wherein the cancellation signal is a combination of the quadrature signal and the in-phase signal.

11. The method of claim 8, wherein a distance of the first pathway is different than a distance of the second pathway.

12. The method of claim 11, wherein the first signal traveling along the first pathway causes the first signal to be approximately 45° out of phase with the second signal.

13. The method of claim 8, wherein causing the cancellation signal synthesizer to generate the cancellation signal further comprises:

causing, by the one or more processors, the cancellation signal synthesizer to utilize pulse width modulation when generating the cancellation signal.

14. The method of claim 8, wherein the cancellation signal synthesizer includes a variable impedance device that is at least one of a pin diode, a field effect transistor (FET), or a bipolar junction transistor (BJT).

15. A non-transitory machine-readable medium comprising instructions that, when executed, cause a machine to at least:

transmit an initial signal;

receive a power amplifier output sample associated with the initial signal;

split the power amplifier output sample into a first signal directed along a first pathway and a second signal directed along a second pathway;

delay the first signal to cause the first signal to be out of phase with the second signal;

determine at least one signal characteristic of a cancellation signal based on the first signal and the second signal; and cause a cancellation signal synthesizer to generate the cancellation signal to at least partially cancel a reflected signal, wherein the cancellation signal is a first cancellation signal, the reflected signal is a first reflected signal, the cancellation signal synthesizer includes a variable impedance device, and after the cancellation signal synthesizer generates the cancellation signal, the instructions, when executed, further cause the machine to at least:

(a) estimate a power level of a second reflected signal;

(b) determine at least one signal characteristic of a second cancellation signal based on the power level;

(c) adjust an impedance value of the variable impedance device to enable the cancellation signal synthesizer to generate the second cancellation signal; and (d) iteratively perform steps (a)-(c) until a minimum reflected power threshold is satisfied or a timeout threshold is exceeded.

* * * * *